United States Patent
Fares (10) Patent No.: US 10,292,039 B2
(45) Date of Patent: May 14, 2019

(54) SYSTEMS AND METHODS FOR ENHANCED MOBILE DATA ROAMING AND CONNECTIVITY

(71) Applicant: CELITECH INC., Santa Clarita, CA (US)

(72) Inventor: Ahmad Fares, Santa Clarita, CA (US)

(73) Assignee: Celitech Inc., Santa Clara, CA (US)

( * ) Notice: Subject to any disclaimer, the term of this patent is extended or adjusted under 35 U.S.C. 154(b) by 0 days.

(21) Appl. No.: 15/881,580

(22) Filed: Jan. 26, 2018

(65) Prior Publication Data

US 2018/0220291 A1   Aug. 2, 2018

Related U.S. Application Data

(60) Provisional application No. 62/451,526, filed on Jan. 27, 2017.

(51) Int. Cl.
*H04W 8/08* (2009.01)
*H04W 8/18* (2009.01)
(Continued)

(52) U.S. Cl.
CPC ........... *H04W 8/08* (2013.01); *H04L 63/0853* (2013.01); *H04L 63/101* (2013.01); *H04W 8/183* (2013.01);
(Continued)

(58) Field of Classification Search
CPC ......... H04W 8/08; H04W 8/183; H04W 8/28; H04W 12/08; H04W 48/02; H04W 12/06; H04L 63/0853; H04L 63/101
(Continued)

(56) References Cited

U.S. PATENT DOCUMENTS

| 8,649,789 B2 | 2/2014 | Shi et al. |
| 8,711,757 B2 | 4/2014 | Ophir et al. |

(Continued)

FOREIGN PATENT DOCUMENTS

| WO | WO2008040964 | 4/2008 |
| WO | 2015183165 | 12/2015 |

OTHER PUBLICATIONS

3GPP; Technical Specification Group Services and System Aspects; International Mobile Station Equipment Identities (IMEI) (Release 7); 3GPP TS 22.016 V.2.0 (Sep. 2009).
(Continued)

*Primary Examiner* — Michael Y Mapa
(74) *Attorney, Agent, or Firm* — Bryan Cave Leighton Paisner LLP (57) ABSTRACT

System and methods are provided for provisioning mobile data services in mobile network systems. By taking advantage of a bifurcated authentication process, the systems and methods described herein provide data services to mobile devices without requiring a secure element such as a SIM card. This allows travelers to benefit from local data networks and services without having to purchase an additional SIM and or change their mobile phone numbers. In addition, these systems and methods allow mobile data users to take advantage of lower local data rates and avoid high roaming costs. Furthermore, these systems and methods provide networks with efficient techniques for servicing visiting/roaming users directly with mobile data without the unnecessary overhead associated with data roaming.

20 Claims, 4 Drawing Sheets

(51) Int. Cl.
    *H04W 8/28*     (2009.01)
    *H04W 12/08*     (2009.01)
    *H04W 12/06*     (2009.01)
    *H04W 48/02*     (2009.01)
    *H04L 29/06*     (2006.01)

(52) U.S. Cl.
    CPC ............. *H04W 8/28* (2013.01); *H04W 12/06* (2013.01); *H04W 12/08* (2013.01); *H04W 48/02* (2013.01)

(58) Field of Classification Search
    USPC ............. 455/410, 432.1–432.3, 435.1–435.3
    See application file for complete search history.

(56) References Cited

U.S. PATENT DOCUMENTS

| | | | |
|---|---|---|---|
| 8,738,729 B2 | 5/2014 | Haggerty et al. | |
| 9,246,883 B2 | 1/2016 | Holtmanns et al. | |
| 9,503,879 B2 | 11/2016 | Faller et al. | |
| 2002/0012351 A1 | 1/2002 | Sofer et al. | |
| 2006/0068786 A1* | 3/2006 | Florence | H04M 1/274516 455/435.2 |
| 2006/0205404 A1 | 9/2006 | Gonen | |
| 2008/0020755 A1 | 1/2008 | Liu et al. | |
| 2009/0125996 A1 | 5/2009 | Guccione et al. | |
| 2010/0211628 A1 | 8/2010 | Shah | |
| 2012/0137364 A1 | 5/2012 | Blaisdell | |
| 2013/0102356 A1 | 4/2013 | Shaw | |
| 2014/0057600 A1 | 2/2014 | Dung | |
| 2014/0080478 A1 | 3/2014 | Costelloe | |
| 2014/0302844 A1* | 10/2014 | Shaw | H04W 48/17 455/432.1 |
| 2016/0087972 A1* | 3/2016 | Ahmavaara | H04L 63/0823 726/10 |
| 2016/0174069 A1 | 6/2016 | Bruner et al. | |
| 2016/0309326 A1* | 10/2016 | Lian | H04W 8/205 |
| 2017/0353813 A1* | 12/2017 | Matthews | H04W 4/50 |
| 2018/0123804 A1* | 5/2018 | Smith | H04W 76/10 |

OTHER PUBLICATIONS

Emile Armour-Heselton, International numbering resources for MVNEs, MVNOs and global M2M/IoT operations (2017).

Liebhart et al., LTE for Public Safety, John Wiley & Sons Ltd. (2015).

International Search Report from PCT/US2018/015579 dated Apr. 5, 2018.

* cited by examiner

SYSTEMS AND METHODS FOR ENHANCED MOBILE DATA ROAMING AND CONNECTIVITY

CROSS-REFERENCE TO RELATED APPLICATIONS

The present application claims the benefit of U.S. Patent Application No. 62/451,526, filed Jan. 27, 2017.

FIELD OF THE INVENTION

The present invention is directed to systems and methods for wireless/cellular/mobile communications. More specifically, the invention relates to improved mobile roaming features and capabilities, as well as improved connectivity, particularly with respect to data services.

BACKGROUND OF THE INVENTION

Mobile data connectivity is already a basic requirement around the globe. Users around the globe employ billions of smartphones and other mobile devices (e.g., wearables) to conduct business using e-mail, Voice Over IP (VoIP) and/or remote telepresence services.

Mobile devices are also used to maintain personal connections and conduct social interactions via applications which share videos, photos and messages. Travelers navigate to and from destinations in various locales using travel applications and digital maps running on mobile devices. Mobile devices are also used by travelers to purchase products and services, pay bills and perform banking services anywhere and everywhere around the globe. Beyond these well-recognized applications for mobile devices, there are countless other applications (e.g., games, social media, etc.) that require a data connection to properly operate.

Despite this reliance on data connectivity, travelers (especially international travelers) find it extremely inconvenient and/or expensive to connect their "home" devices to local mobile networks in other locations. As an example of this inconvenience, travelers may buy a new Subscriber Identity Module (SIM) card to replace the "home" SIM in their phone. Purchase of a new SIM is inconvenient for a number of reasons: 1) travelers typically have to locate a shop or possibly a vending machine to purchase the SIM; 2) they would need remove the "home" SIM and replace it, which may require a specialized tool; and 3) because of this replacement, travelers lose their "home" phone number making it more difficult for others to contact them.

Generally, specialized hardware/software/firmware is used to provision mobile data and voice services. This specialized hardware/software/firmware takes the form of a secure element. In certain 3G/4G networks, this secure element may be called a SIM or possibly an eSIM (a more flexible SIM format). In certain other 3G/4G networks (e.g., CDMA), it may be referred to as a user identity module (UIM). For simplicity, secure elements (including hardware/software/firmware elements) which are used to provision mobile data services may be referred to herein as a subscriber identification module or SIM. Currently, without SIM replacement travelers are at the mercy of their home carrier's mobile data roaming pricing, which is typically 3 to 3000 times more expensive than local packages. Mobile data roaming is expensive because it usually involves compensating three parties (home network, intermediary transit service provider, and the visited network), while being governed by Global System for Mobile Communication Association (GSMA) standardized roaming agreements—among different global mobile network operators (MNOs)—that were initially designed for mobile voice roaming and not for data roaming.

Consequently, due to the cost and inconvenience, the vast majority of travelers do not enable data roaming while traveling. Instead, travelers mainly attempt to connect to data services using "free" public or even paid access Wi-Fi services. However, Wi-Fi is not necessarily readily available. For example, in many destinations, Wi-Fi is only intermittently available at select locations (e.g., at hotels, coffee shops, or other public places). When available, Wi-Fi connectivity—even a city-wide installation—is not a true alternative to the level of data connectivity offered by mobile networks. For example, due to Wi-Fi's different limitations including capacity, mobility, handover, and scheduling capability, Wi-Fi does not provide the seamless and reliable connectivity experience offered by mobile networks. Accordingly, the above described travel practices result in a huge unmet demand for mobile data.

Therefore, there is a need for improved mobile data connectivity systems and methods for travelers, especially for those who are continuously "on the go" outside of their home networks.

SUMMARY OF THE INVENTION

Described herein is a novel platform that may be integrated into existing mobile networks, which enables any visited network to directly and effectively identify, authenticate, provision, and charge smartphone/mobile devices users for mobile data services. This platform may be especially useful for Mobile Virtual Network Operators (MVNOs) and/or mobile network operators. The techniques provided by the systems and methods described herein enable affordable mobile data connectivity especially for international travelers (e.g., those traveling from their home country mobile network to a country not covered by their home network). By providing techniques for limiting the unnecessary influence of others (e.g., home network operators and/or intermediary transit service providers) in the provision of mobile data services, the system and methods described herein reduce data costs while also enabling seamless and continuous data connections (e.g., to the internet via mobile networks).

In certain embodiments, the described systems and methods provide enhanced mobile data connectivity and roaming without requiring a secure element (e.g., SIM, eSIM reprogramming, network-based SIMs, or UIM profile provisioning in the case of CDMA). As described herein, instead of using such a secure element, the provision of, authentication of, and verification of the entitlement to mobile data services is provided by an improved network hardware/architecture in addition to web-based, PC-based, and/or mobile application (e.g., an Android or iOS application or extension thereof, mobile operating system, mobile device firmware, and/or background device service). The web, PC, and/or mobile application may be a native application or browser, which enables the purchase and consumption of mobile data using a dedicated server and/or a cloud-based computing platform. Such a server may be integrated with a cellular/mobile network. In certain embodiments, the dedicated server utilizes existing interfaces to expand its service provisioning capabilities in order to enable the provisioning of data services to mobile devices without requiring the presence of secure element (e.g., SIM. eSIM, UIM, etc.).

In certain embodiments, the improved network hardware/ architecture may include an application server(s) which is connected to and configured to communicate with a mobile network (e.g., in $3^{rd}$ Generation "3G" networks), an enhanced Evolved Packet Core (EPC) (e.g., in $4^{th}$ Generation "4G" networks) and/or an enhanced Network Functions Virtualization (NFV) (e.g., in $5^{th}$ Generation "5G" networks). In certain embodiments, mobile data may be purchased in a package specifying the length of time (e.g., 1 week) or amount of data to be allotted (e.g., 1 gigabyte or unlimited). This purchase may happen before travelling to (e.g., when travel is booked) or when the subscriber is in a location lacking access to a subscriber's home network. In certain embodiments, identification and authentication of the user's purchase/device may occur between the web/PC/ mobile application, server/cloud, and/or the enhanced network hardware (e.g., MME, EIR, PCRF and/or HSS in case of 4G). By employing the systems and methods described herein, travelers may be provided with mobile data services without the need to replace their home SIM cards (or mobile phones) or update their device firmware.

Accordingly, travelers will benefit from easily accessible and fairly-priced mobile data services for existing generations of mobile communications (e.g., third and fourth generations 3G and 4G) as well as forthcoming ones (e.g., fifth generation 5G and beyond). Moreover, travelers will have increased transparency and control of their mobile data services because it will no longer depend on contractual agreements amongst three separate entities with opaque tax/fee structures. Thus, the potential for "bill shock" suffered by mobile roaming users may be completely eliminated. Instead, travelers' devices will be able to directly interact with visited networks (e.g., for the provision of a pre-paid data package) without requiring a special secure element.

Other benefits and features of the present invention may become apparent from the following detailed description considered in conjunction with the accompanying drawings. It is to be understood, however, that the drawings are designed solely for purposes of illustration and not as a definition of the limits of the invention.

System and methods for provisioning mobile data services to a mobile device in a mobile network are provided. The systems and methods detect a change in a roaming state of the mobile device and in response to detecting that the mobile device is roaming, cause the mobile device to switch to a specified APN. In certain embodiments, the APN is configured to process and allow network attachment for the purpose of providing data services to whitelisted mobile devices. The systems and methods also initiate a network attachment to the specified APN without the use of a subscriber identification module. The systems and methods further transmit an authentication identifier by the mobile device. In certain embodiments, the authentication identifier is not associated with a subscriber identification module. After successful network attachment of the mobile device to the mobile network for data services, the systems and methods receive a user-level verification request from the mobile network, transmit user-level verification data in response to receiving the user-level verification request from the mobile network, and receive mobile data services from the mobile network.

In certain embodiments, the whitelisted mobile devices are mobile devices associated with pre-authorized mobile data services on the mobile network. In certain embodiments, the network attachment is initiated by placing a call from the mobile device to a specialized phone number which is pre-configured in the mobile network. In certain embodiments, the authentication identifier is a device identifier. In certain embodiments, the device identifier is an IMEI/ IMEISV/MEID. In certain embodiments, the systems and methods further determine whether the mobile device has been tampered with and if tampering is detected, transmit tampering data to the mobile network. In certain embodiments, the tampering data indicates at least one of: rooting, jailbreaking, bootloader unlocking and IMEI/IMEISV/ MEID modification. In certain embodiments, the systems and methods further receive and store network configuration settings data for the specified APN in association with pre-authorized mobile data services. In certain embodiments, the systems and methods further receive and store network configuration settings data for the specified APN based on previously transmitted mobile device capabilities. In certain embodiments, the systems and methods further create a VPN between the mobile device and a VPN server within the mobile network. In certain, embodiments, the systems and methods detect a change in a roaming state of the mobile device based on a trip timeframe previously stored as part of confirmation data received for pre-authorized mobile data services.

System and methods for provisioning mobile data services to a mobile device in a mobile network are provided. The systems and methods, configure an APN in the mobile network to process and allow network attachment for the purpose of providing data services to various mobile devices. The systems and methods also receive a network attachment request to the configured APN from the mobile device and an authentication identifier from the mobile device. In certain embodiments, the authentication identifier is not associated with a subscriber identification module. The systems and methods further verify the authentication identifier against a database of whitelisted mobile devices and after verifying the authentication identifier, transmit a user-level verification request to the mobile device. The systems and methods also receive user-level verification data from the mobile device and in response to verifying the user-level verification data, allow the mobile device to receive data services from the mobile network.

In certain embodiments, the whitelisted mobile devices are mobile devices that have pre-authorized mobile data services on the mobile network. In certain embodiments, the network attachment request is initiated by a call placed from the mobile device to a specialized phone number provided by the mobile network and pre-loaded in the mobile device. In certain embodiments, the authentication identifier is a device identifier. In certain embodiments, the device identifier is an IMEI/IMEISV/MEID. In certain embodiments, in response to receiving tampering data from the mobile device, the systems and methods remove the mobile device from the database of whitelisted mobile devices. In certain embodiments, the tampering data indicates at least one of: rooting, jailbreaking, bootloader unlocking and IMEI/IM- EISV/MEID modification. In certain embodiments, the systems and methods further create a VPN between the mobile device and a VPN server within the mobile network.

System and methods for provisioning mobile data services to a mobile device in a mobile network are provided. The systems and methods include a mobile device and a mobile network: The mobile network includes an APN that is configured to process and allow network attachment for the purpose of providing data services to whitelisted mobile devices. The mobile device is configured to detect a change in its roaming state and in response to detecting that the mobile device is roaming, switch to the APN. The mobile device is also configured to initiate a network attachment to the APN without the use of a subscriber identification module and transmit an authentication identifier to the mobile network. In certain embodiments, the authentication identifier is not associated with a subscriber identification module. After successful network attachment of the mobile device to the mobile network for data services, the mobile device is further configured to transmit user-level verification data to the mobile network in response to receiving a user-level verification request from the mobile network. The mobile network is configured to verify the authentication identifier against a database of whitelisted mobile devices. After verifying the authentication identifier, the mobile network is configured to transmit the user-level verification request to the mobile device. In response to verifying the user-level verification data received from the mobile device, the mobile network is configured to allow the mobile device to receive data services from the mobile network.

BRIEF DESCRIPTION OF THE DRAWINGS

Further features of the invention, its nature and various advantages will be more apparent from the following detailed description of the embodiments, taken in conjunction with the accompanying drawings in which.

DETAILED DESCRIPTION OF EMBODIMENTS OF THE INVENTION

The provision of mobile services is a bifurcated practice. More specifically, mobile voice service is linked to a home mobile number which is issued by an MNO and is referred to as Mobile Station International Subscriber Directory Number (MSISDN). This MSISDN identifies a mobile phone number internationally and is linked to home networks (e.g., through country/area codes). On the other hand, mobile data provisioning is not associated with an MSISDN but instead utilizes an International Mobile Subscriber Identity (IMSI). Mobile data service is typically routed to internet servers that are not necessarily located in the home network/country. For example, a given server can be located in any country. Thus, unlike MSIDN-linked voice traffic, a user's mobile data traffic does not need to be inefficiently routed through a user's home network gateway, which is currently the case in many data roaming services.

Accordingly, the present invention takes advantage of this bifurcated process by recognizing that mobile data services can be fully provisioned, authenticated, and verified locally in any country (e.g., a country that is not the traveler's home country) using dynamically generated or other identifiers, such as device serial numbers (e.g., IMEIs/IMEISVs/MEIDs), account numbers, etc. Furthermore, the systems and methods described herein provide techniques for provisioning data services using higher-level protocols (e.g., user-level applications and/or application programming interfaces (APIs)) without the need for a secure element (e.g., SIM, UIM, eSIM, etc.). Unlike existing solutions, the present invention takes advantage of this bifurcated authentication arrangement and allows travelers to maintain their home mobile number service (e.g., MSISDN) via their home SIM while also provisioning, authenticating, and verifying data services via a user-level application. This improvement enables the user to receive mobile data at reduced local rates. In addition, this improvement substantially eliminates the need for data traffic and associated billing data to be roamed/channeled back to the traveler's home network. Thus, the improved mobile data service is both less expensive and faster in most instances.

Figure 1:
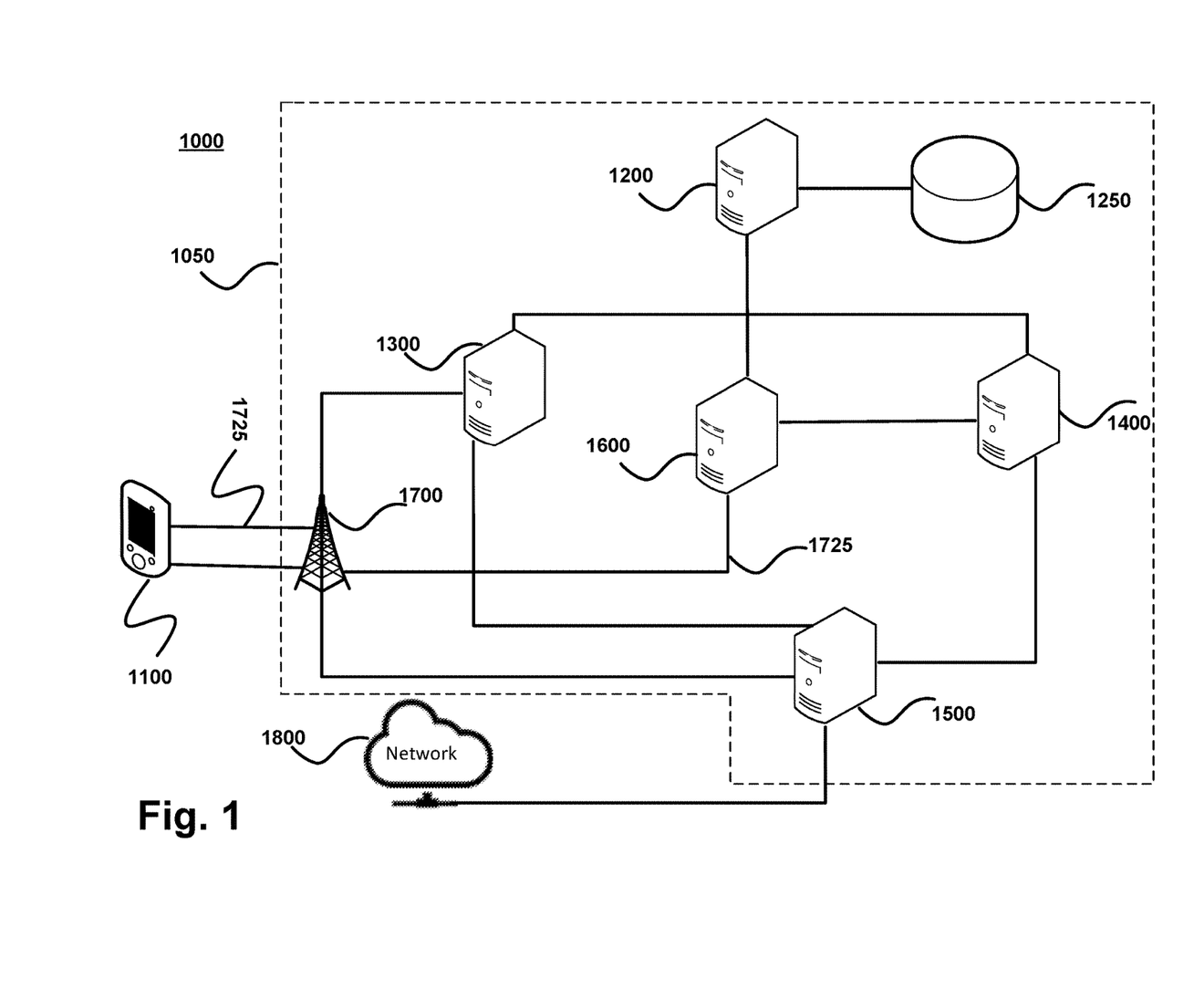
FIG. 1 is a block diagram illustrating a system in accordance with certain embodiments.

FIG. 1 is a schematic diagram of a mobile network system 1000 according to certain embodiments of the invention. Mobile network system 1000 may include a mobile network 1050 and a mobile device 1100. Mobile device 1100 may be any device capable of connection to mobile networks such as 2G, 3G, 4G or future networks (e.g., 5G and beyond). For example, mobile device 1100 may be a smartphone, smartwatch, wearable device, connected vehicle, smart meter, tablet, portable computer, voice-assistant device and/or Wi-Fi hotspot. Mobile network system 1000 may also include an application server 1200. In certain embodiments, application server 1200 may be a web server or cloud-computing platform. In certain embodiments, application server 1200 provides functionality for creating user accounts, receiving device data details (e.g., serial number/IMEI/IMEISV/MEID, device radio/cellular capabilities, etc.), receiving/providing authentication and/or verification data, purchasing mobile data, and/or authenticating/verifying user accounts for provisioning the use of mobile data. Application server 1200 may include or connect to a database 1250 for storing and retrieving account data and other data (e.g., whitelists, blacklists). Application server 1200 and/or database 1250 may or may not be part of mobile network 1050.

Mobile network system 1000 may also include additional components such as Mobility Management Entity (MME) 1300, Home Subscriber Server (HSS) 1400, and/or gateway/radius server 1500 (e.g., Serving Gateway and/or PDN Gateway with attached Policy and Charging Rules functionality). In addition, mobile network system 1000 may include a network operator server 1600 (e.g., an Equipment Identity Register EIR database server), which may be configured to communicate with application server 1200 and/or MME 1300 (e.g., over 3GPP interface S13/S13' in 4G) in a network for authorizing devices and providing data services on mobile network system 1000. Server 1600 may be either a dedicated, standalone server (e.g., an existing EIR) or may be integrated with other elements such as application server 1200 and/or HSS 1400. Authorization, authentication, verification and other transfers in mobile network system 1000 may be accomplished securely using techniques such as encryption (e.g., public key encryption, symmetric encryption, and/or other secure protocols).

In a typical cellular/mobile network (e.g., 4G network), mobile devices (e.g., smartphones) include a SIM or other secure element having an IMSI, encryption keys as well as other additional user subscription data. The mobile device typically connects to the mobile network (for voice, text, and data services together) by transmitting the SIM's IMSI or its other derivatives (e.g., M-TMSI, GUTI, etc.). During the connection setup procedure, the mobile network's MME requests authentication info from the HSS (which stores the IMSI, encryption keys and other subscription info). The MME-HSS pair authenticates the mobile device to the mobile network using this data. Similarly, the mobile device with its secure element/SIM authenticates the mobile network on the device side. Following successful mutual authentication (mobile device and network), the mobile device is successfully attached to the network, and in the case of a 4G network: a default PDN, an internet PDN and an IMS PDN connections are typically established for data, voice, and text services.

In contrast to the above procedure, in certain embodiments of the present invention, mutual authorization and authentication of a mobile device 1100 and mobile network system 1000 for mobile data services occurs without reliance on a secure element/SIM. For example, instead of relying on an IMSI or substitute as described above, mutual authentication of mobile device 1100 and mobile network system 1000 occurs via a transmission of a separate identifier by the mobile device 1100 to the mobile network system. For example, the identifier may be a smartphone serial number or any of its derivatives (e.g., IMEI/IMEISV/MEID), a unique number stored in a mobile app which may be hidden or unknown to the user, another number/identifier which may be both known to the user and mobile network or a combination thereof.

In certain embodiments, mobile network system 1000 includes a wireless transceiver 1700 for communicating with mobile device 1100. In certain embodiments, wireless transceiver 1700 may be an eNodeB or BTS. Wireless transceiver 1700 may be capable of authenticating mobile device 1100 using a restricted communication link 1725 between mobile device 1100 and network operator server 1600. Preferably, mutual authentication between mobile device 1100 and mobile network system 1000 for mobile data services does not require a SIM or other secure element. Wireless transceiver 1700 may also provide a connection (e.g., via gateway 1500) between mobile device 1100 and a network (e.g., WAN/LAN/internet) 1800, such as the internet. Preferably, connection between network 1800 and the mobile device 1100 is only provided after mobile device 1100 is authenticated and verified in accordance with certain embodiments described herein.

Figure 2:
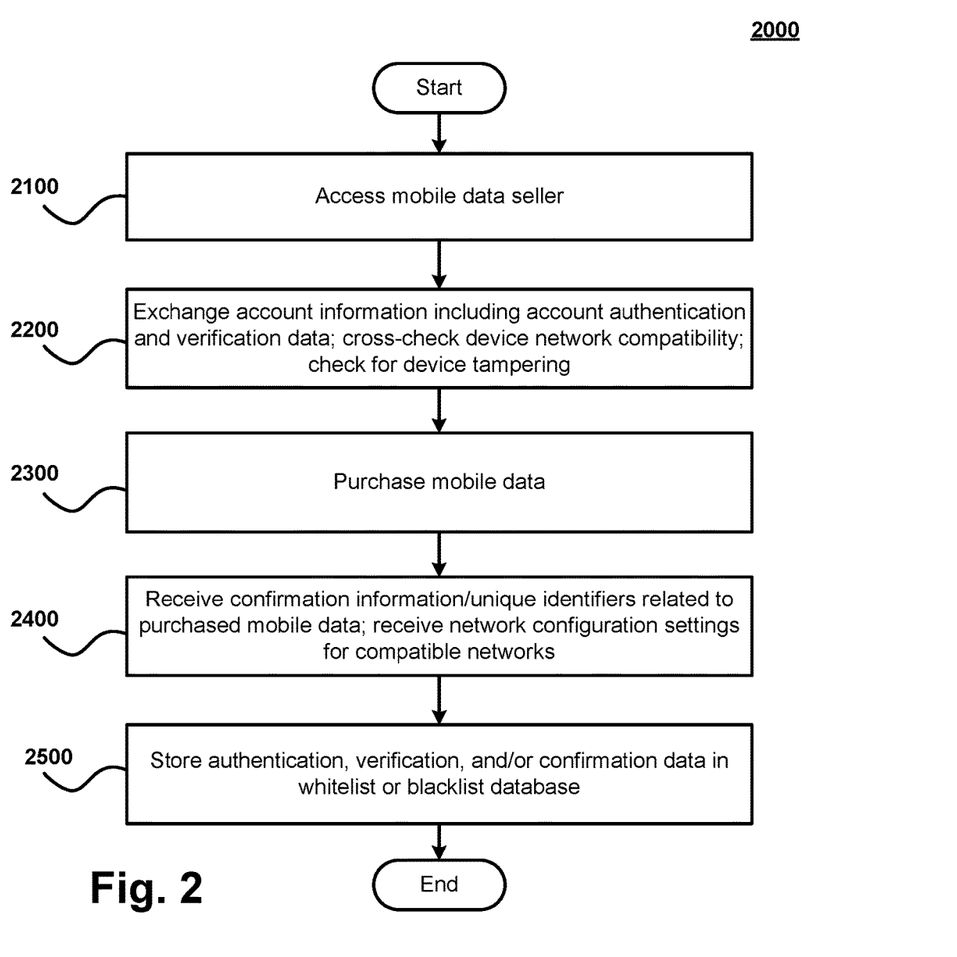
FIG. 2 is a flow diagram illustrating a process for enabling the provision of mobile data services according to certain embodiments.

FIG. 2 is a flow chart illustrating an exemplary method 2000 for enabling the provision of mobile data services in a mobile network system (e.g., mobile network system 1000) according to certain embodiments of the present invention. In step 2100, a user may access a seller of mobile data services. For example, a user may access mobile data seller via an application (e.g., a mobile, PC, and/or web app) downloaded from an app store or using an internet browser on a mobile device (e.g., mobile device 1100). In certain embodiments, a user is provided with the opportunity to purchase mobile data as part of the booking of a travel package. For example, user may be able to select and purchase a data volume (e.g., 1 GB or unlimited) and/or a set time period (e.g., 7 days) for data delivery. In certain embodiments, the number of days for data delivery and/or data volume is based on the length of travel. For example, the number of days purchased may default to the length of travel. Once booking and/or mobile data purchase is complete, the user may be provided with a browser link to access the purchased mobile data once the user arrives at the travel destination or be directed to download a corresponding mobile application.

In step 2200, a user may establish an account. For example, an account may established by contacting application server 1200. In certain embodiments, an account may be established using a username and password as well as other details (e.g., personal identifying information, security questions/answers, device capabilities, device identity information such as serial number, an International Mobile Equipment Identity (IMEI/IMEISV/MEID) number, and/or user credit card details). Username, password, and/or other account establishment data may be transmitted securely (e.g., encrypted using a public key). Additional device identity data concerning a mobile device (e.g., mobile device 1100) may be provided to application server 1200 in order to further identify the mobile device and/or a user. Such additional identifying data may include mobile device capabilities (e.g., radio data capabilities, mobile network capabilities, such as frequency bands, 3G/4G compatibility, processor capabilities, memory capabilities, or other hardware/software/firmware capabilities). In certain embodiments (e.g., where a user is attempting to purchase data service using the mobile device itself), this identifying data may be provided directly from the mobile device (e.g., automatically from the device, such as by an application, background process, operating system, or server). In certain embodiments, the mobile device capabilities are derived by using reference to a device identifier (e.g., IMEI/IMEISV/MEID). In certain embodiments, the mobile device capabilities are derived after a user specifies/selects a particular phone model to be used with the mobile data services. In certain embodiments, a mobile network system (e.g., mobile network system 1000) stores account/device identification data (e.g., personal identifying information and/or device identity information such as a serial number, an International Mobile Equipment Identity (IMEI/IMEISV/MEID) number, and/or user credit card details) and/or mobile device capabilities. In certain embodiments, account/device identification data transmitted to establish an account may be used to authenticate and/or verify a user/mobile device, as further discussed below.

In certain embodiments, an application server (e.g., application server 1200) or another server (e.g., in mobile network system 1000) cross-checks the mobile device capabilities previously received from a mobile device (e.g., mobile device 1100). For example, the server may cross-check with mobile networks to confirm compatibility between one or more mobile networks and the mobile device. Such a cross-check may be based on the user's specified travel destination. In certain embodiments, network-device compatibility check is performed prior to the purchase of or allowing the purchase of a mobile data package. In certain embodiments, checks performed prior to enabling the purchase of mobile data package include checking for device tampering (e.g., to confirm the likely authenticity of a mobile device's identifier, such as IMEI/IMEISV/MEID) and if such a tampering/integrity check indicates tampering, application server may prevent the purchase of a mobile data package. In certain embodiments, an application executing on the mobile device may determine whether the mobile device has been tampered with (e.g., rooted, jailbroken, bootloader unlocked, etc.). In certain embodiments, tamper status of the mobile device is transferred to an application server. In certain embodiments, a mobile device tamper status check is performed prior to the purchase of or allowing the purchase of a mobile data package. In certain embodiments, if a mobile device tamper status check indicates tampering of the mobile device, a server (e.g., application server 1200) may prevent the purchase of a mobile data package.

In step 2300, the user may (pre-) purchase/(pre-) authorize mobile data services for a specified country/mobile network of travel. In certain embodiments, this may be performed using an existing internet connection (e.g., Wi-Fi, home mobile network, etc.). As discussed above, in certain embodiments, mobile data (pre-) purchase/(pre-) authorization is only enabled after a compatibility check between an identified mobile device and one or more mobile networks and/or a tamper status check of the mobile device. In step 2300, to (pre-) purchase/(pre-) authorize mobile data services a user may select a mobile data allotment (e.g., time and/or volume-based) and provide a purchasing instrument (e.g., a credit card number, virtual wallet, physical currency, cryptocurrency, or other payment tool). In certain embodiments, to (pre-) purchase/(pre-) authorize mobile data services a purchase instrument is left on file—and charged as data is used or to enable additional purchases of mobile data packages. In addition, user may provide details of the planned usage (e.g., dates and/or location of usage). In certain embodiments, for example, when (pre-) purchasing/(pre-) authorizing mobile data as part of a travel booking, any and all of the details may be automatically provided/bundled as part of the travel booking itself.

In step 2400, the user may receive confirmation of the (pre-) purchase/(pre-) authorization indicating the mobile data allotment purchased and/or the time/place of usage. In certain embodiments, confirmation data is stored at the user's mobile device (e.g., in memory associated with a mobile application or a browser cookie). In certain embodiments, a unique identifier may be generated and stored on a mobile device and be made accessible to an application stored on the mobile device. In certain embodiments, a unique identifier may be generated by application server 1200 and transmitted to a user's mobile device and stored in memory. In certain embodiments, a unique identifier may be generated by an application executing on a mobile device and stored in memory. A unique identifier may be computed using user/device/account identification data, trip purchase data, and/or cryptographic nonces. In certain embodiments, confirmation data and/or unique identifiers may be used to authenticate and/or verify a user/mobile device, as further discussed below.

In certain embodiments, a mobile device (e.g., mobile device 1100) stores network configuration settings data required to connect to the (pre-) purchased mobile data services for compatible networks. Such network configuration data (e.g., APN settings) may be accessible to a web/PC/mobile application executing on a mobile device. In certain embodiments, network configuration settings data is transmitted to a mobile device by a server (e.g., application server 1200) in a mobile network system (e.g., mobile network system 1000). For example, a mobile device may receive and store network configuration settings data associated with pre-purchased mobile data services. In certain embodiments, network configuration data is transmitted to a mobile device as part of application/application data/application update retrieved from an "App Store." In certain embodiments, a mobile device receives network configuration data based upon previously transmitted or known mobile device capabilities. In certain embodiments, an application/background service/operating system/firmware executing on mobile device uses network configuration data to modify or add Access Point Name "APN" settings on the mobile device. In certain embodiments, an application executing on a mobile device/web/PC instructs the user on how to modify APN settings based on stored/received network configuration data.

In step 2500, authentication, verification, and/or confirmation data is stored in a mobile network system (e.g., mobile network system 1000) as part of a "whitelist" or "blacklist" database. "Whitelist" database is used to indicate that a user/mobile device is permitted to access mobile data services supplied by a mobile network system. For example, 'whitelist" database entries may be associated with mobile devices/users that have purchased access to mobile data services. Conversely, "blacklist" database entries are associated with users/mobile devices that are not permitted to access data services supplied by a mobile network system. In certain embodiments, mobile devices/users are associated with whitelist/blacklist databases via an IMEI/IMEISV/MEID, account number, unique identifier or any other data discussed in relation to method 2000.

In certain embodiments, more than one whitelist and/or blacklist databases may be used. For example, separate whitelists may be used to indicate the level of data services to which a user/mobile device is permitted to receive. In certain embodiments, whitelists and/or blacklists may be maintained or added to an existing database (e.g., EIR), stored in a database in communication with an application server (e.g., application server 1200), or stored in another server in a mobile network system (e.g., mobile network system 1000). In certain embodiments, user/mobile device identifying data maintained in whitelists may be moved to blacklists or removed from a whitelist. For example, a mobile network may move to a blacklist from a whitelist or simply remove from a whitelist a user/mobile device once an allocated data allotment is exhausted, the timeframe for a trip has expired, or if mobile network has received an indication of device tampering, or for a service violation.

Figure 3:
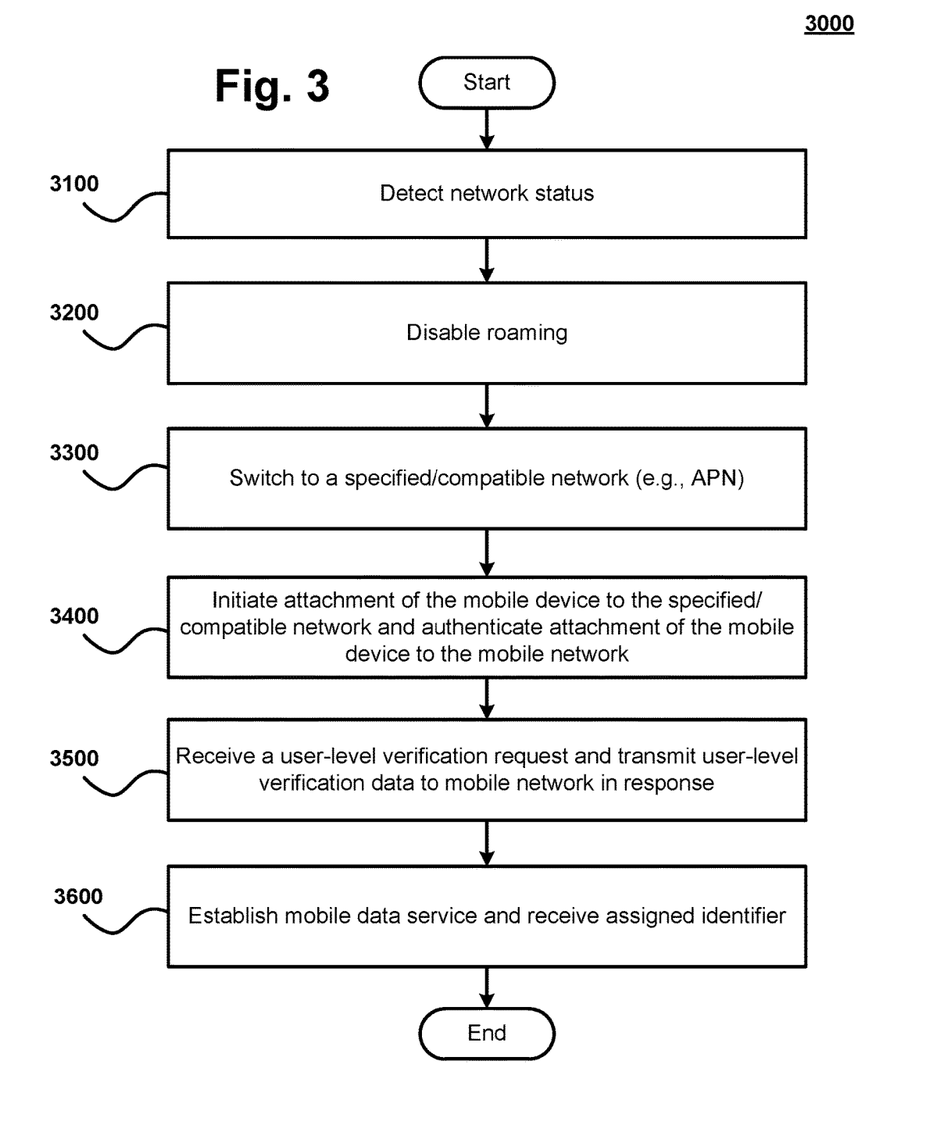
FIG. 3 is a flow diagram illustrating a process for accessing mobile data services according to certain embodiments.

FIG. 3 is a flow chart illustrating an exemplary method 3000 for enabling the provision, authentication, and/or verification of mobile data services in a mobile network system (e.g., mobile network system 1000) according to certain embodiments of the present invention. In step 3100, a mobile device (e.g., mobile device 1100) may detect a change in a roaming state of the mobile device. For example, a mobile device may detect a change from a non-roaming to roaming state. In certain embodiments, a service running in the background on a mobile device as part of a mobile application or operating system may detect (e.g., via device location services) when the mobile device (and user) is roaming away from the home network. In certain embodiments, home/roaming network status is detected based on one or more SIMs installed in a mobile device. In certain embodiments, confirmation data (e.g., received in step 2400, discussed above) stored on a mobile device is used to detect the change in network status. For example, status change detection may only execute in a trip timeframe previously stored as part of received confirmation data.

In step 3200, roaming (e.g., data roaming) on a mobile device may be disabled. In certain embodiments, roaming is disabled using APIs, which may be provided by an operating system. In certain embodiments, the user is instructed (e.g., via pictures, onscreen messages or email) on how to disable roaming. In step 3300, a mobile device may be switched to a specified/compatible mobile data network for providing mobile data services outside of a home network. For example, in response to detecting that a mobile device is in a roaming state, the mobile device switches to a specified APN. In certain embodiments, switching networks is accomplished using APIs, which may be provided by an operating system. In certain embodiments, the user is instructed (e.g., via pictures, onscreen messages or email) on how to switch to a compatible network by changing the device network selection mode to manual and selecting an indicated hosting network, such as by selecting and/or adding an indicated compatible APN). In certain embodiments, a mobile data network is switched to automatically based upon confirmation and/or configuration data previously stored in a mobile device and made accessible to an application (e.g., using a user-controlled network list which is standardized by 3GPP).

In step 3400, attachment of a mobile device to the selected/visited (specified/compatible) network is initiated. For example, a mobile device may initiate network attachment to the identified APN without the use of a secure element. In certain embodiments, network attachment is initiated by placing a mobile call or sending a particular SMS message to a specialized phone number (e.g., three-digit number or toll-free number), which may be (pre-) stored in the mobile device (e.g., mobile device 1100), configured at the selected a mobile data network (e.g., via the APN). In certain embodiments, specialized phone number/particular SMS are provided to the user via an application executing on a mobile device or are accessible to an application executing on a mobile device. In certain embodiments, an application executing on a mobile device initiates network attachment by placing a call based on data stored in the mobile device, which is also accessible to the application. For example, the application may use an in-app eCall or send an app generated message containing identifying data (e.g., data received and/or stored in the steps of FIG. 2). In certain other embodiments, a mobile application instructs the user on how to initiate network attachment to the mobile data network.

In certain embodiments which do not utilize a SIM/IMSI/IMSI-like secure substitutes (e.g., TIMSI, GUTI), authentication of attachment to the mobile data network is performed using another identifier (e.g., an identifier received and stored in step 2400 described above). For example, in performing network attachment, a mobile device may transmit an authentication identifier. In certain preferred embodiments, authentication identifier is not associated with a secure element. In certain preferred embodiments, authentication identifier is a device serial number (e.g., IMEI/IMEISV/MEID). More specifically, placing a call or sending an SMS message to a specialized telephone number (e.g., three-digit number or toll-free number) configured at the selected mobile data network (e.g., via the APN) initiates an attachment protocol which bypasses the conventional SIM-based authentication process. For example, MME 1300 in mobile network system 1000 or a similar component of a mobile network system bypasses authentication-related communication with an HSS (or similar component) via its standard S6a interface. Accordingly, a user/mobile device is not authenticated using IMSI/TMSI/etc. and/or authentication keys pre-stored in the HSS and the device secure element. Instead, in certain embodiments, an MME (e.g., MME 1300, via its standard interface S13) and/or an application server (e.g., application server 1200) via communication with MME, or another server (e.g., EIR), authenticates a user/mobile device by utilizing a different type of authentication identifier transmitted by the mobile device. For example, authentication of a user/mobile device to the network utilizes the mobile device IMEI/IMEISV/MEID. In certain other embodiments, authentication of a user/mobile device to the mobile network utilizes data received and stored in the steps of the method 2000. After receiving the authentication identifier (e.g., IMEI/IMEISV/MEID), a mobile network system may cross-check the device identifier (e.g., against a whitelist accessible to the mobile network system).

In step 3400, once a user/mobile device is successfully authenticated following initial network attachment to the identified compatible APN, further verification may be performed. For example, after successful network attachment of a mobile device to the mobile network for data services, the mobile device may receive a user-level verification request from the mobile network and transmit user-level verification data in response to receiving the user-level verification request from the mobile network. In certain embodiments, additional user-level verification may be performed utilizing user and/or subscription data (e.g., as exchanged in method 2000 of FIG. 2). This additional verification step may prevent usage of (pre-)purchased/(pre-authorized) data services when a mobile device is lost or stolen. In certain embodiments, a user account/mobile device is verified by transmitting account data from the mobile device to a limited access APN and/or one or more mobile network servers. Account data may include username, password, non-rooted phone IMEI/IMEISV/MEID, credit card data, passcodes, and/or encryption keys (e.g., data transmitted and stored as described in method 2000 of FIG. 2). In certain embodiments, account verification data may be further transmitted to a third-party server outside of a mobile network system (e.g., a server associated with a mobile application executing on a mobile device or otherwise associated with the purchased mobile data). In certain embodiments, account verification data may be transmitted over a limited-purpose network connection (e.g., restricted communication link 1725 of FIG. 1, which may be a TCP/IP link via a dedicated APN) and/or via short messaging service (SMS). For the purposes of the systems and methods described herein, a network connection may be considered "limited purpose" or restricted when it is limited to the verification of users of pre-purchased data services. In certain embodiments, such a restricted network connection may also allow users to access certain servers or websites to allow users to purchase mobile data services (e.g., similar to the limited access provided while purchasing Wi-Fi service in a hotel). More specifically, authorized but unauthenticated users/devices are provided limited access to the data services of a mobile network for the purpose of carrying out verification of pre-purchased data services or even purchase of data services in other cases. This is in contrast to SIM/secure element-based authentication, which occurs at lower network levels (higher privilege levels) like the physical and data-link layers. For example, users/mobile devices may be allowed to visit a specific IP address or hostname (e.g., using a restricted website) to register/authenticate/verify themselves or purchase data services via a browser or other user-level application. However, users who have not already purchased data and been authorized and authenticated will not have the ability to access services customarily associated with open network connections (e.g., e-mail, VoIP, generic web access).

In step 3500, once authenticated and/or verified, mobile data services may be carried out on the same APN to which initial attachment occurred. In certain other embodiments, a mobile network system provides mobile data services to a mobile device via another linked "internet" APN, which is selected by a mobile network system (e.g., mobile network system 1000) and configured for such data connectivity services. A mobile device may switch to this linked APN as described above.

Many mobile apps and web domains use secure and reliable protocols such as HTTPS. Accordingly, there is less of a need for mobile data systems to employ the standardized network based cyphering and integrity protection provided by symmetric cryptographic algorithms which utilize IMSI and/or secret keys that are typically stored both on the SIM card and in the mobile network system itself (e.g., HSS). Such encryption schemes were initially designed to protect voice and text services, and thus while they are more stringent than asymmetric public key encryption, they might not be necessary for current data services which are usually encrypted by default at other levels (e.g., application and/or transport layer). In certain embodiments, however, to increase security, authentication data may be used to create a VPN between a mobile device and a VPN server (e.g., at gateway 1500 or application server 1200) within a mobile network system. For example, application server 1200 of mobile network system 1000 may include one or more VPN servers for receiving and transmitting data securely.

In step 3600, a mobile device may receive a dynamic or temporarily assigned identifier, which is used to identify the authenticated user/mobile device on the mobile network system (e.g., for authorization, accounting and online charging). In certain embodiments, this identifier may be similar to an IMSI, Globally Unique Temporary Identifier (GUTI) or a Temporary IMSI (TIMSI), which is here termed a Digital IMSI (DIMSI). In certain embodiments, the identifier (e.g., 901-global or local DIMSI) may be provided by a third-party server (e.g., application server 1200 of FIG. 1). In certain embodiments (e.g., when acting as an MVNO-partner), first or third-party application server (e.g., application server 1200 of FIG. 1) may receive and pool identifiers from network operators (e.g., MVNOs) which provide the purchased data. In certain embodiments, the identifier is assigned by a server associated with the network operator (e.g., MNO) providing the data, such as an HSS or similar server.

In prior systems, both IMSI and TIMSI/GUTI were used for authentication with IMSI being transmitted rarely (e.g., during authentication since it uniquely identifies the subscriber and could be the subject of theft) and with TIMSI being used in its place via association with a specific subscriber's IMSI. Due to the temporary nature of travel and/or the data package allotments themselves, it is possible to forego the IMSI-TMST mapping of prior systems and instead use a single and temporary identifier such as a Digital-IMSI (DIMSI), which is not associated with a SIM and is used within a mobile network system. In certain embodiments, such an identifier may have a more limited purpose, for example to be used for data usage accounting and charging purposes. Additionally, since they are temporary, such identifiers may be dynamically generated and allocated whenever needed by a user or a mobile network system. Moreover, such temporary identifiers may be mapped to a device 1100 serial number (e.g., IMEI/IMEISV/MEID) without necessarily being loaded to a dedicated secure element (e.g., SIM) on such a device.

In certain embodiments, an integrity protection algorithm may be deployed using a mobile application executing on the device. Identity protection algorithm may confirm both the device and network identities. For example, a mobile device or an application/service executing on a mobile device may attempt to determine whether the mobile device has been tampered with (e.g., jailbroken, rooted, bootloader unlocked, IMEI/MEID modified, etc.). Tamper status determination may be performed at any time in relation to the performance of the methods of FIG. 3 (e.g., before initial attachment), periodically during or periodically after a mobile device has been attached and/or authenticated to a mobile network system. In certain embodiments, if a mobile device or an application/service executing on a mobile device determines that the mobile device may have been tampered with, the mobile device may terminate the connection with the mobile network system. In addition, if device tampering is detected, a mobile device may transmit tampering data (e.g., type of tampering detected) to the mobile network system. In response to receiving tampering data, a mobile network system may communicate with a mobile device (e.g., send an SMS message, app notification, e-mail, etc.) indicating to the user that tampering has been detected. In response to receiving tampering data from a mobile device, a mobile network system may also remove the mobile device/user from any "whitelist" and/or add the mobile device/user to a "blacklist."

Accordingly, from the user's perspective, the systems and methods described above are beneficial because no new SIM or hardware is required. Instead, the user is able to access lower cost mobile data services while traveling. Mobile data services are enabled automatically via mobile device background services and/or by simply navigating the user interface or browser of a mobile device. These systems and methods are especially beneficial since the user's main/home phone number is maintained, while also not requiring the use of a new short-term local SIM.

Figure 4:
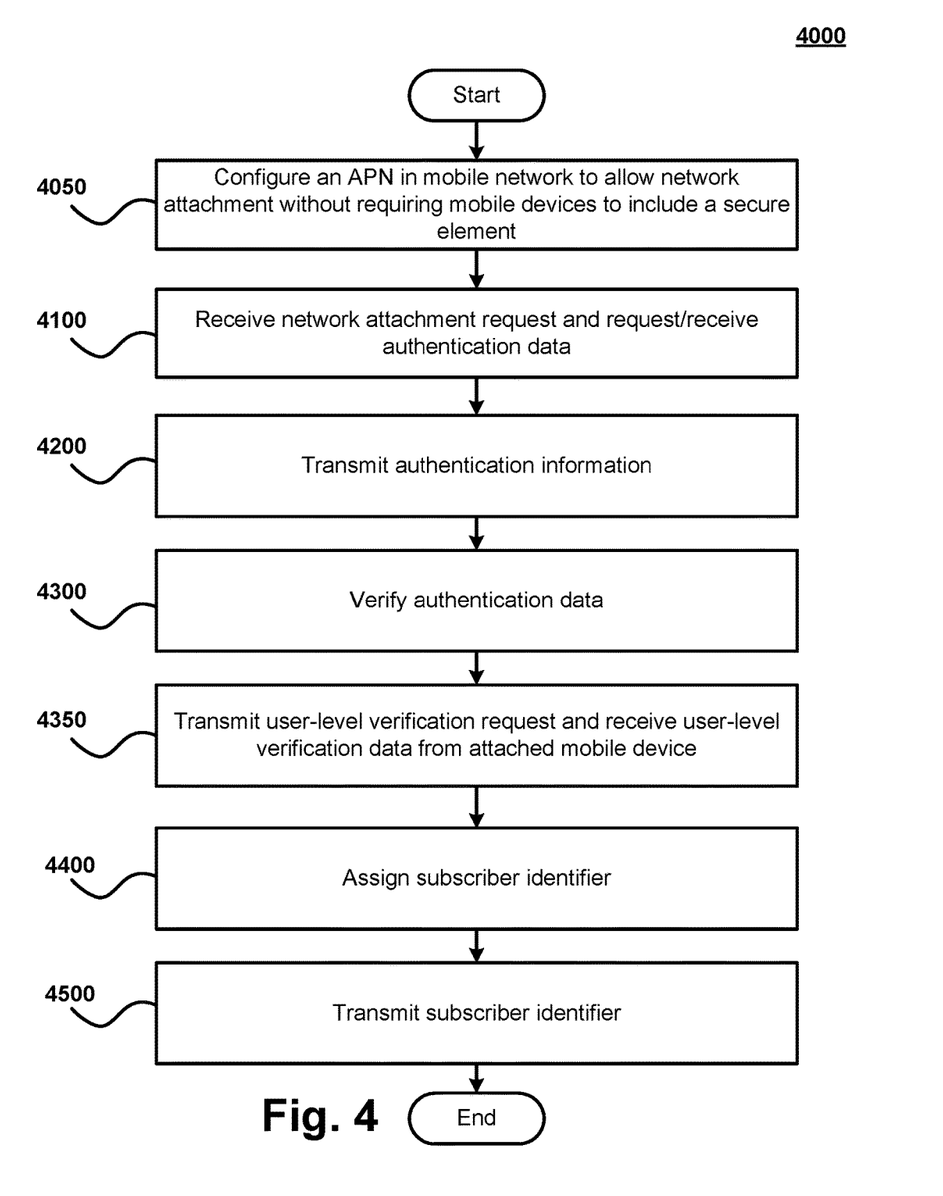
FIG. 4 is a flow diagram illustrating a process for authenticating mobile data services by improved network hardware/architecture according to certain embodiments.

FIG. 4 is a flow chart illustrating an exemplary method 4000 for authenticating mobile data services using improved network architecture/hardware, such as mobile network system 1000. In certain embodiments, steps of the method of FIG. 4 may be carried out in coordination with a wireless transceiver (e.g., wireless transceiver 1700 of FIG. 1, which as discussed above may be an eNodeB and/or BTS) along with an enhanced mobile network. For example, enhanced 3G/4G/5G mobile network systems may include not only standard network elements/interfaces but additional servers like application server 1200. A mobile network system is considered "enhanced" because in addition to supporting traditional SIM-based authentication of mobile devices, enhanced mobile network is configured to support additional forms of authorization, authentication, and verification for provisioning mobile data services, which are the subject of the systems and method described herein. Thus, the mobile network is able to support and be compatible with traditional 3G/4G/5G authentication standards. In addition, the mobile network system is able to provide authorization, authentication, and verification services for mobile devices via web/PC/mobile application utilizing higher-levels (e.g., user-level) protocols and messages (e.g., at the application layer).

In step 4050, one or more APNs provided by a mobile network system (e.g., mobile network system 1000) are configured to process and allow network attachment without requiring mobile devices (e.g., mobile device 1100) to include a secure element. In certain embodiments, one or more APNs provided by a mobile network system are additionally or optionally configured to process and allow network attachment for the purpose of providing data services to whitelisted mobile devices. In certain embodiments, whitelisted mobile devices are mobile devices that have pre-purchased mobile data services on the mobile network. For example, configuring an APN to allow network attachment without requiring attaching mobile devices to include a secure element may include configuring APN and/or another portion of a mobile network system to accept network attachment utilizing a device serial number (e.g., IMEI/IMEISV/MEID). In this configuration, placing a call or sending an SMS message to a specialized telephone number provided by the APN initiates an attachment protocol which bypasses the conventional SIM-based authentication process. For example, MME 1300 in mobile network system 1000 or a similar component of the mobile network system bypasses communication with an HSS (or similar component) via its standard S6a interface. Accordingly, a user/mobile device is not authenticated using IMSI/TMSI/etc. or authentication keys pre-stored in both the HSS and the mobile device secure element. Instead, in certain embodiments, an MME (e.g., MME 1300, via its standard interface S13) or an application server (e.g., application server 1200 via communication with an MME), or another server (e.g., EIR or similar) authenticates a user/mobile device using a different type of authentication identifier transmitted by the mobile device. For example, authentication of a user/mobile device to the network utilizes the mobile device IMEI/IMEISV/MEID. In certain embodiments, APN of a mobile network system (e.g., mobile network system 1000) may be configured to transmit/receive initial network attachment and authentication data over a restricted mobile network connection, such as a restricted communication link (e.g., restricted communication link 1725 of FIG. 1).

In step 4100, a mobile network system (e.g., mobile network system 1000) may receive a network attachment request from a mobile device. In response to an initial request for network attachment, a mobile network system may request and/or receive authentication data/, such as an authentication identifier from a mobile device. In certain preferred embodiments, requested and/or received authentication identifier is not associated with a secure element. Authentication identifiers/authentication data may include: user profile data, password, e-mail address, credit card details, IMEI/IMEISV/MEID, location, app-generated passcodes, encryption keys, and/or other data exchanged as discussed above in relation to method 2000. In certain preferred embodiments, authentication data includes a device IMEI/IMEISV/MEID. In certain embodiments, authentication data may be transmitted and received over a mobile network connection, such as a restricted communication link (e.g., restricted communication link 1725 of FIG. 1). In certain embodiments, authentication data may be transmitted and received as part of an SMS or call placed to a specialized phone number provided by a visited network/APN. In certain embodiments, authentication data may be transmitted/received over heterogeneous networks. For example, authentication data may be transmitted from a mobile device over a Wi-Fi connection and received via a wired network connection.

In step 4200, authentication data may be transmitted to one or more servers (e.g., operator server 1600 and/or application server 1200 of FIG. 1). In step 4300, received authentication data is verified. In certain embodiments, a mobile network system verifies received authentication identifiers against a database of whitelisted mobile devices. In certain embodiments, whitelisted mobile devices are mobile devices that have pre-purchased mobile data services on the mobile network. For example, authentication data may be verified via a comparison of registration data (e.g., a whitelist) stored in a database (e.g., database 1250 of FIG. 1). For example, once mobile network receives an initial network attachment request from a mobile device, the MME (e.g., via its standard 3GPP interface S13/S13') may verify the authentication data transmitted by the device (e.g., IMEI/IMEISV/MEID) against "white-listed" authentication data stored either in database server 1600 (EIR) and/or application server 1200. As discussed above with respect to method 2000, users/mobile devices that have a legitimate IMEISV and a purchased data package would be "white-listed" and thus would be allowed by the MME to proceed with the network attachment. In certain embodiments, network attachment further establishes a PDN connection via a dedicated and restricted APN. In certain embodiments, steps 4100-4300 serve as a first authorization step, with APN access initially restricted for authentication of users/mobile devices.

Due to the open nature of the initial network authentication/purchase connection, such authentication/purchase connection may be susceptible to Denial of Service (DoS) attacks, whether distributed or not. Accordingly, the initial verification and authorization described above (e.g., MME verification of IMEISV) is a critical pre-requisite to ameliorate potential DoS attacks by limiting network access to legitimate devices with purchased services and thus, only allow such devices to access the restricted APN for the further authentication, before provisioning actual mobile data services. In addition, for further security, it may be beneficial to further filter access to a mobile network using data other than IMEI/IMEISV/MEID, such as: user data (e.g., country of origin), location (e.g., via mobile device GPS) and forecasts of travelers expected to visit a network at a given time.

In certain embodiments, step 4350 occurs in response to initial network attachment and authentication. In step 4350, a mobile network system may require additional data for account verification. For example, after verifying a received authentication identifier, a mobile network system may transmit a user-level verification request to an authenticated mobile device and receive user-level verification data from the mobile device/user. In response to verifying the user-level verification data, a mobile network system allows mobile device to receive data services from the mobile network.

Examples of verification data are discussed with respect to the steps of method 2000. In certain embodiments, following initial network attachment, a mobile network system (e.g., mobile network system 1000) transmits a message (e.g., SMS, e-mail, app notification) to the now attached mobile device, informing the user of the further account verification requirement. In certain embodiments, the message informs the user of the information necessary for further verification. In certain embodiments, the message includes a web-address linked to a web page or app for inputting additional account verification data. In certain embodiments, a user/mobile device may be further verified by responding/replying (e.g., via SMS, e-mail, in-app message) to the message transmitted by the mobile network system and providing the required further verification data. In certain embodiments, a user/mobile device may be further verified by connecting to a server (e.g., application server 1200) at a particular web address and providing further verification data.

In certain embodiments, prior to a user/mobile device being further verified, a mobile network system (e.g., mobile network system 1000) detects when the mobile device requests a particular data APN/service (e.g., HTTP/HTTPS/SMTP/SMS) over a mobile network system. In response to detecting such a request, a mobile network system may respond in an appropriate manner in order to gather verification data from the user/mobile device. For example, if a mobile device transmits an HTTP/HTTPS request, a mobile network system may provide an HTTP/HTTPS response (e.g., web page) providing a form for the required further verification data to be entered and transmitted to the mobile network system. As another example, if a mobile device transmits an SMTP or SMS message, a mobile network system may provide an appropriate response (e.g., an email or SMS message) requesting additional verification data and/or providing a web-link, as discussed above.

In certain embodiments, a user/mobile device may be given a set time period to complete further account verification. For example, a user/mobile device may be given a limited timeframe (e.g., five minutes) to complete account verification. Following the expiration of the set time period or a set number of account verification failures, a mobile network system may disconnect a mobile device from the mobile network. In certain embodiments, a previously authorized (e.g., a whitelisted user/mobile device) is moved to a blacklist (e.g., a general blacklist or blacklist limited to users/mobile devices that fail to verify). In certain embodiments, a user/mobile device previously blacklisted for account verification failure may be moved back to a whitelist (e.g., after a set period of time, such as 5/15/30 minutes or after placing a call to customer service).

In certain embodiments, as discussed above, in order to increase security, verification/authentication data may be used to create a VPN between a mobile device and a VPN server within a mobile network system. For example, application server 1200 or gateway 1500 of a mobile network system (e.g., mobile network system 1000) may include one or more VPN servers for receiving and transmitting data securely with one or more mobile devices.

In step 4400, a subscriber identifier may be assigned if the authentication data is verified. For example, a subscriber identifier may be an IMSI, TMSI, GUTI or DIMSI as discussed above. In step 4500, the subscriber identifier may be transmitted to a mobile device and made accessible to a mobile application or instead may be stored in a mobile network system only (e.g., for usage accounting and charging purposes). In certain embodiments, a subscriber identifier may be transmitted to various components of FIG. 1 (e.g., mobile device 1100, MME 1300, HSS 1400, operator server 1600, application server 1200). In certain embodiments, a subscriber identifier may be transmitted and received over a mobile network connection, such as a restricted communication link (e.g., restricted communication link 1725). In certain embodiments, a subscriber identifier or other authentication parameters (e.g., passcode) may be transmitted and received via SMS and/or in-app message. In certain embodiments, a subscriber identifier may be transmitted over heterogeneous networks (e.g., Wi-Fi, WiMAX, or cellular networks). For example, a subscriber identifier may be transmitted from a mobile device over a Wi-Fi connection and received via a wired network connection.

While there have been shown and described various novel features of the invention as applied to particular embodiments thereof, it will be understood that various omissions and substitutions and changes in the form and details of the systems and methods described and illustrated, may be made by those skilled in the art without departing from the spirit of the invention. Those skilled in the art will recognize, based on the above disclosure and an understanding therefrom of the teachings of the invention, that the particular hardware and software processes that are parts of FIGS. 1-4, and the general functionality provided by and incorporated therein, may vary in different embodiments of the invention. Accordingly, the particular system components and processes shown in FIGS. 1-4 are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation.

What is claimed is:

1. A method for provisioning mobile data services to a mobile device in a mobile network, the method comprising:
   detecting a change in a roaming state of the mobile device, wherein detecting the change in roaming state of the mobile device is based on a trip timeframe previously stored as part of confirmation data received for pre-authorized mobile data services;
   in response to detecting that the mobile device is roaming, causing the mobile device to switch to a specified Access Point Name (APN), wherein the APN is configured to process and allow network attachment for the purpose of providing data services to whitelisted mobile devices;
   initiating a network attachment by the mobile device to the specified APN without the use of a subscriber identification module;
   transmitting of an authentication identifier by the mobile device, wherein the authentication identifier is not associated with a subscriber identification module;
   after successful network attachment of the mobile device to the mobile network for data services, receiving a user-level verification request from the mobile network;
   transmitting user-level verification data in response to receiving the user-level verification request from the mobile network; and
   receiving mobile data services from the mobile network.

2. The method of claim 1, wherein the whitelisted mobile devices are mobile devices associated with pre-authorized mobile data services on the mobile network.

3. The method of claim 1, wherein the network attachment is initiated by placing a call from the mobile device to a specialized phone number which is pre-configured in the mobile network.

4. The method of claim 1, wherein the authentication identifier is a device identifier.

5. The method of claim 4, wherein the device identifier is an International Mobile Equipment Identity (IMEI), an International Mobile Equipment Identity Software Version (IMEISV), or a Mobile Equipment Identifier (MEID).

6. The method of claim 1, further comprising determining whether the mobile device has been tampered with and when tampering is detected, transmitting tampering data to the mobile network.

7. The method of claim 6, wherein the tampering data indicates at least one of: rooting, jailbreaking, bootloader unlocking, International Mobile Equipment Identity (IMEI) modification, International Mobile Equipment Identity Software Version (IMEISV) modification, and Mobile Equipment Identifier (MEID) modification.

8. The method of claim 1, further comprising receiving and storing network configuration settings data for the specified APN in association with pre-authorized mobile data services.

9. The method of claim 1, further comprising receiving and storing network configuration settings data for the specified APN based on previously transmitted mobile device capabilities.

10. The method of claim 1, further comprising creating a Virtual Private Network (VPN) between the mobile device and a VPN server within the mobile network.

11. A system comprising a mobile device and a mobile network:
    the mobile network comprising an Access Point Name (APN) configured to process and allow network attachment for the purpose of providing data services to whitelisted mobile devices;

the mobile device configured to:

detect a change in its roaming state based on a trip timeframe previously stored as part of confirmation data received for pre-authorized mobile data services;

in response to detecting that the mobile device is roaming, switching to the APN;

initiate a network attachment to the APN without the use of a subscriber identification module;

transmit an authentication identifier to the mobile network, wherein the authentication identifier is not associated with a subscriber identification module; and after successful network attachment of the mobile device to the mobile network for data services, transmit user-level verification data to the mobile network in response to receiving a user-level verification request from the mobile network;

the mobile network configured to:

verify the authentication identifier against a database of whitelisted mobile devices;

after verifying the authentication identifier, transmit the user-level verification request to the mobile device; and in response to verifying the user-level verification data received from the mobile device, allow the mobile device to receive data services from the mobile network.

12. The system of claim 11, wherein the whitelisted mobile devices are mobile devices associated with pre-authorized mobile data services on the mobile network.

13. The system of claim 11, wherein the network attachment is initiated by placing a call from the mobile device to a specialized phone number which is pre-configured in the mobile network.

14. The system of claim 11, wherein the authentication identifier is a device identifier.

15. The system of claim 14, wherein the device identifier is an International Mobile Equipment Identity (IMEI), an International Mobile Equipment Identity Software Version (IMEISV), or a Mobile Equipment Identifier (MEID).

16. The system of claim 11, wherein the mobile device is further configured to determine whether the mobile device has been tampered with and when tampering is detected, transmit tampering data to the mobile network.

17. The system of claim 16, wherein the tampering data indicates at least one of: rooting, jailbreaking, bootloader unlocking, International Mobile Equipment Identity (IMEI) modification, International Mobile Equipment Identity Software Version (IMEISV) modification, and Mobile Equipment Identifier (MEID) modification.

18. The system of claim 11, wherein the mobile device is further configured to receive and store network configuration settings data for the APN in association with pre-authorized mobile data services.

19. The system of claim 11, wherein the mobile device is further configured to receive and store network configuration settings data for the APN based on previously transmitted mobile device capabilities.

20. The system of claim 11, wherein the mobile device is connected to a Virtual Private Network (VPN) server within the mobile network.

* * * * *